July 29, 1941.   M. H. MANN   2,251,147
TYPEWRITING MACHINE
Filed Dec. 15, 1938    10 Sheets-Sheet 5

INVENTOR
MILES H. MANN
BY
ATTORNEY

July 29, 1941.  M. H. MANN  2,251,147
TYPEWRITING MACHINE
Filed Dec. 15, 1938  10 Sheets-Sheet 6

INVENTOR
MILES H. MANN
BY
ATTORNEY

July 29, 1941.    M. H. MANN    2,251,147
TYPEWRITING MACHINE
Filed Dec. 15, 1938    10 Sheets-Sheet 7

INVENTOR
MILES H. MANN
BY
ATTORNEY

July 29, 1941.   M. H. MANN   2,251,147
TYPEWRITING MACHINE
Filed Dec. 15, 1938   10 Sheets-Sheet 8

INVENTOR
MILES H. MANN
BY
ATTORNEY

Fig. 17

Patented July 29, 1941

2,251,147

UNITED STATES PATENT OFFICE 2,251,147

TYPEWRITING MACHINE

Miles H. Mann, West Hartford, Conn., assignor to Underwood Elliott Fisher Company, New York, N. Y., a corporation of Delaware Application December 15, 1938, Serial No. 245,941

16 Claims. (Cl. 197—66)

This invention relates to typing machines and more particularly to mechanism for quickly conveying work forms into and out of typing position. The typing may proceed, for a succession of forms, on a continuous work web conveyed past the printing line by means of a paper roller or feeder.

An object of the invention is to provide an efficient power driven mechanism operatable, after typing a form, for imparting to the paper roller or feeder a movement or sweep of comparatively large extent so as to bring the first-line-place of a succeeding form immediately into typing position.

Another object is to apply such mechanism to a paper roller which constitutes a revoluble platen in a typing machine, and it is a further object to arrange the mechanism so that a carriage mounting the revoluble platen or paper roller may ordinarily move in letter feed and return directions.

A motor mechanism for returning the carriage may be of the kind shown in Patent No. 1,835,776 to W. F. Helmond, dated December 8, 1931, in which a normally inactive motor becomes operative to return the carriage merely through starting the motor as by means of a switch.

It is an object of the invention to employ such motor mechanism for also operating the form feeding mechanism, and it is a further object to provide means whereby the start of the motor for a form feeding operation is prevented from returning the carriage.

Another object is to provide means for blocking overthrow of the paper roller by the form feeding mechanism and to have the paper roller normally free of such means so that the latter do not interfere with ordinary rotation or line spacing of the paper roller.

Another object is to provide at the keyboard of a typewriter employing the form feeding mechanism a key manually operable for effecting the form feeding operation.

Another object is to have the form feeding mechanism operable only when the carriage is fully returned to a predetermined position.

The foregoing and other objects, features and advantages will be apparent from the following description of a preferred embodiment of the invention.

Figure 1:
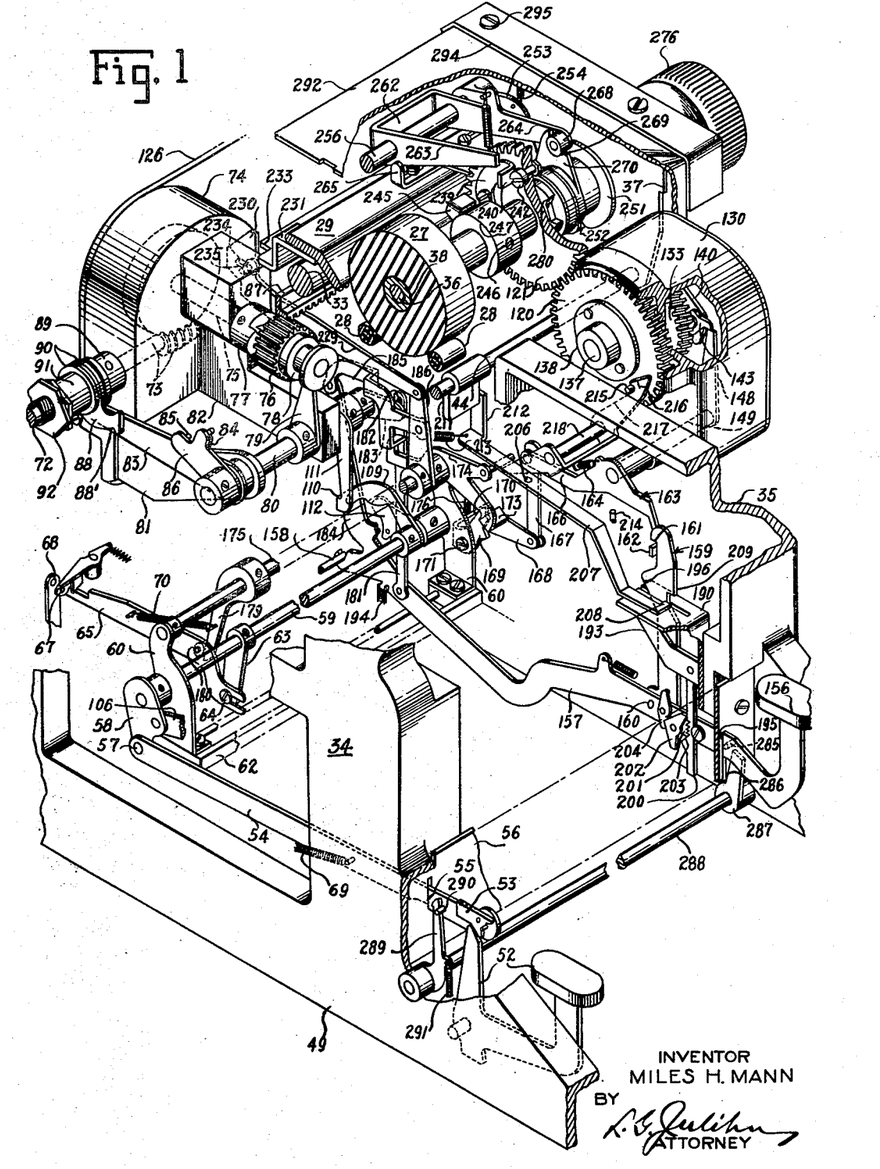
Figure 1 is a perspective view of a typing machine employing the invention, some of the parts being shown broken away and sectioned to bring out details.
Figures 2, 3, 4:
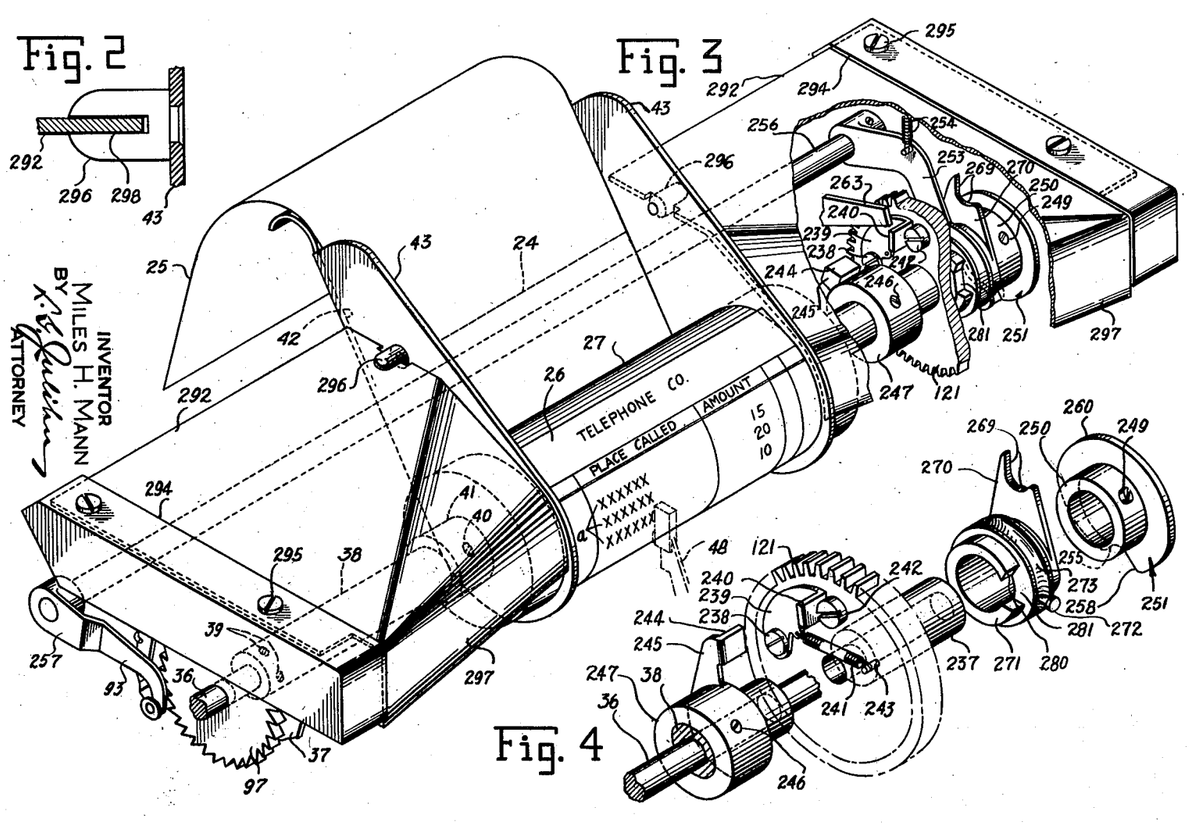
Figure 2 illustrates a detail of a mechanism guard.
Figure 3 is a perspective of the platen carriage including its portion of the form-feeding mechanism.
Figure 4 is a perspective spread of details of some of the parts of the form-feeding mechanism.

A continuous work web 25, presenting a succession of telephone toll bill forms 26, severable on lines 24, Figure 3, is feedable lengthwise by means of a platen or paper roll 27 and cooperative pressure rolls 28, Figure 1. The platen 27 is revolubly supported in a carriage comprising a frame 29 having rollers 30 and lugs 31, engaging, respectively, front and rear tracks 32, 33 mounted on side members 34, 35 of the machine framework.

A platen axle 36 is journaled in carriage end plates 37 suitably supported by the platen frame 29. A tubular sleeve 38 may be fixed to the platen axle 36 by set screws 39, Figure 3, and the platen may be fixed to said sleeve 38 by set screws 40 in a platen hub 41.

A web guiding chute, Figure 3, comprises an upwardly and rearwardly inclined floor 42 at the intake side of the platen and web-edge-guiding sides 43 through which the platen extends.

A tie rod 44 connecting the carriage end plates 37 may support arms, not shown, for the pressure rolls 28 as exemplified in Patent No. 1,392,940 to W. F. Helmond, dated October 11, 1921.

Figure 17:
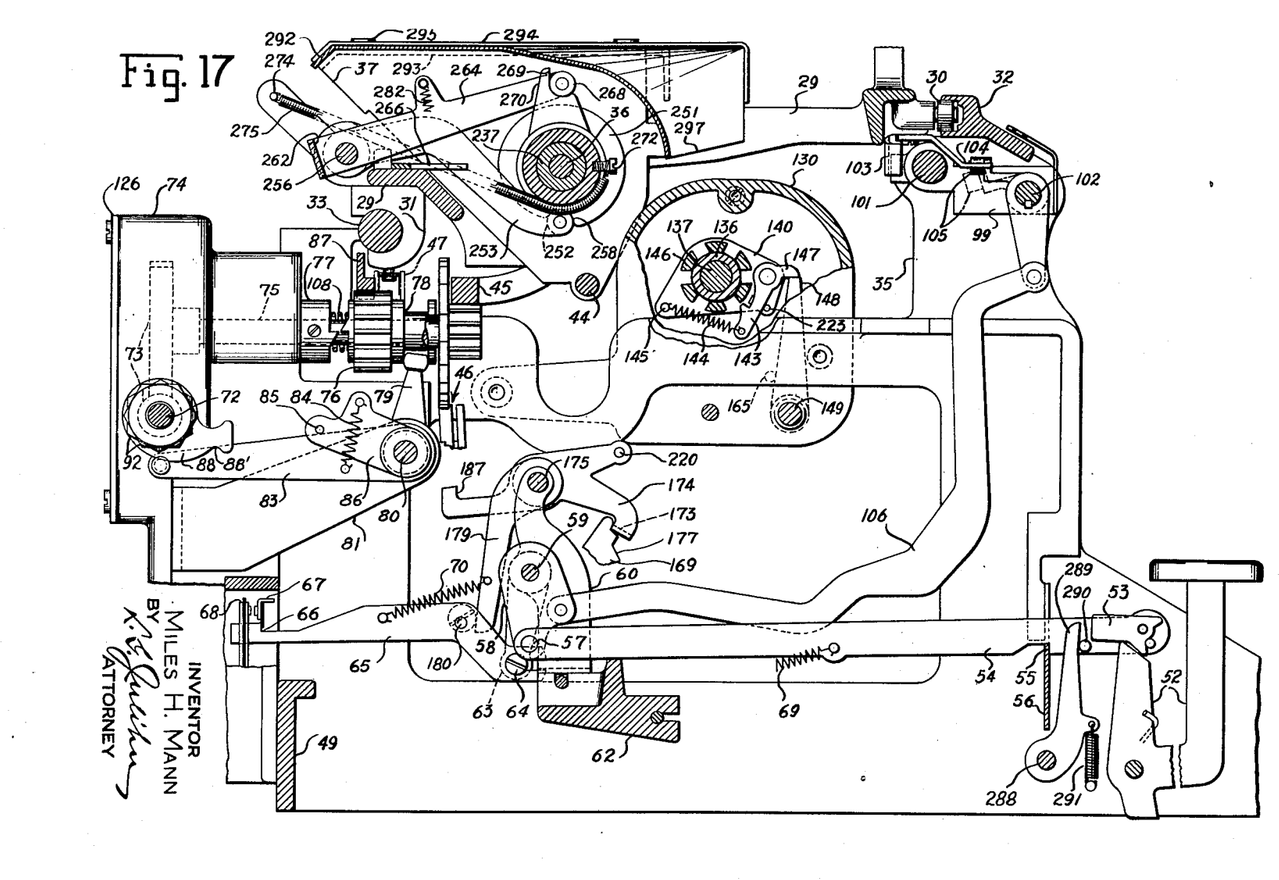
Figure 17 is a sectional side view of the machine including the carriage return mechanism in normal position.

A letter-feed rack 45 on the carriage frame 29, escapement 46, and a spring drum 47, Figure 17, cooperate to advance the carriage in letter-feeding direction at operation of the type-bars 48, Figure 3, to type on the work web 25.

Each telephone toll bill 26 is typed to list a subscriber's calls in individual lines $a$, Figure 3, of the bill. After each typing of a line, the platen may be line-spaced and the carriage returned by power to a line-start position by means of the following mechanism.

Figures 8, 9:
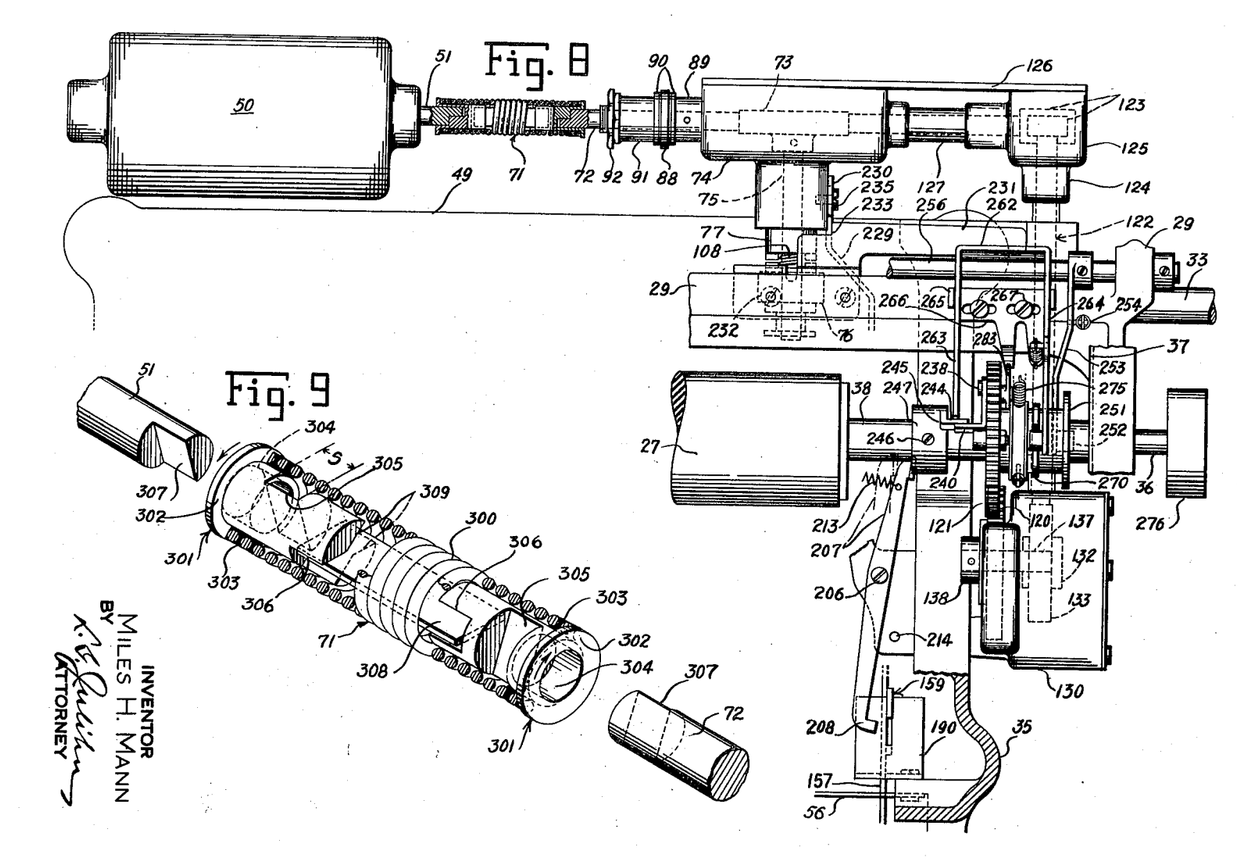
Figure 8 is a top plan view of the motor transmission and form-feeding mechanism.
Figure 9 is a perspective illustrating details of a spring coupling in the motor transmission.

An electric motor 50 is suitably supported at the left back corner of the typewriter frame 49, as in Figure 8, and presents transversely a horizontal drive shaft 51.

Figures 18, 19, 20:
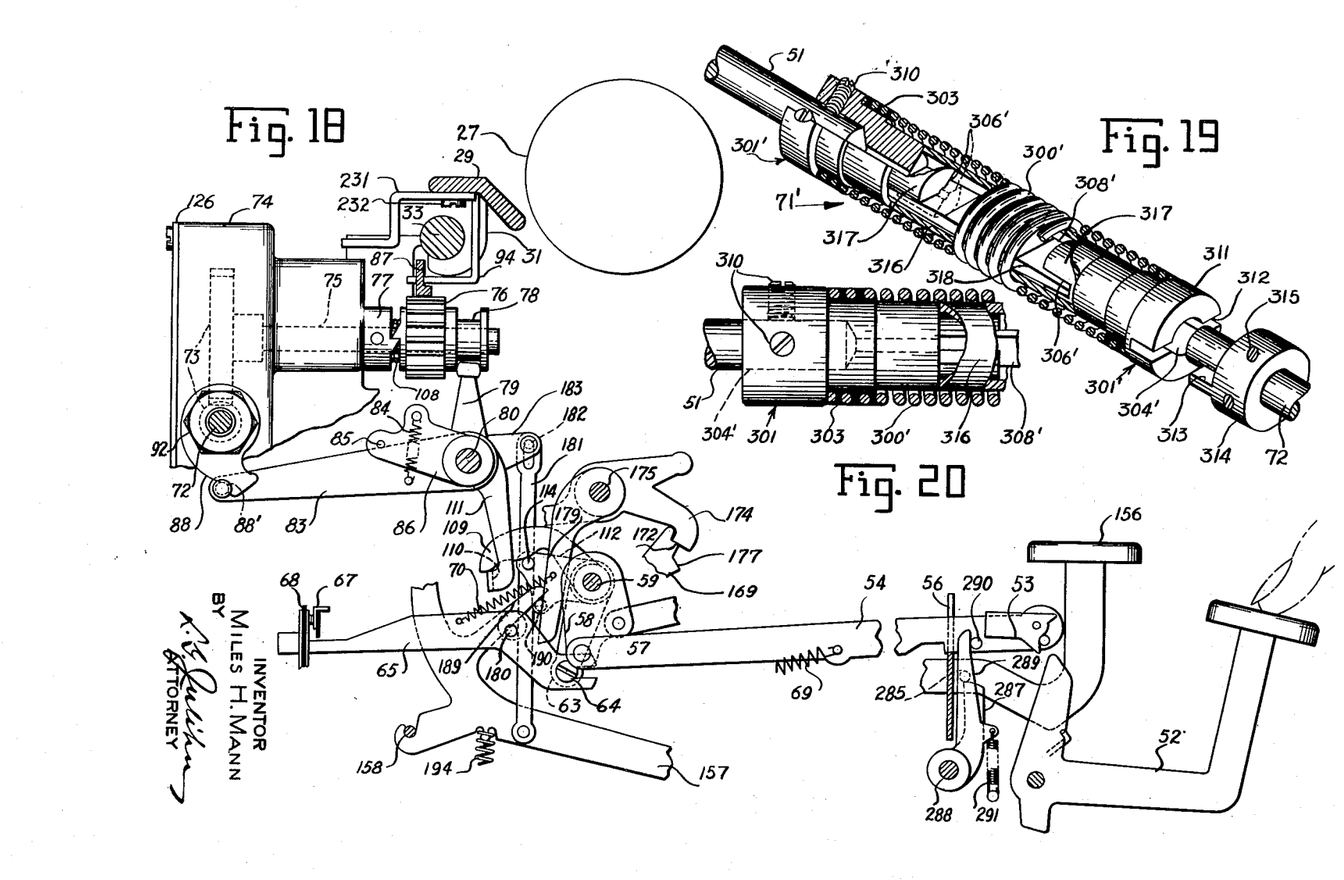
Figure 18 is a side view showing the parts of the carriage return mechanism in operated positions.
Figure 19 is a perspective, partly sectioned, of a modified spring coupling.
Figure 20 is a sectional view of the Figure 19 coupling.

A carriage return key lever 52 fulcrumed on the typewriter frame is manually rockable from the normal position, Figure 17, to the Figure 18 position to engage a pawl 53 of a trip link 54 to lift and release the latter from latching engagement, as at 55, Figure 17, with a cross plate 56 supported by the framework. The trip link 54 is pivoted at 57 to an arm 58 fixed to a transverse rock shaft 59 journaled in brackets 60 on a cross member 62 of the framework. Another arm 63 fixed to said rock shaft 59 has a pin and slot pivotal connection 64 to a bar 65 adapted as at 66 to control a spring pressed contact 67. In the normal position of the parts, Figure 17, said bar 65 keeps said contact 67 separated from a companion contact 68. Upon release of the trip link 54, a spring 69 moves the latter rearwardly to the Figure 18 position thereby rocking the shaft 59 and moving the bar 65 rearwardly, counter to the pull of a spring 70, to cause the contacts 67, 68 to close to close a suitable circuit to start the motor, the motor being normally inactive.

The motor shaft 51 is connected by a spring coupling 71, Figure 8, to an input shaft 72 of a worm and worm wheel gearing 73 in a housing 74 mounted at the back of the typewriter frame 49. An output shaft 75 of said gearing has a clutch-toothed carriage-return pinion 76 shiftable therealong into and out of engagement with a clutch collar 77 on said shaft 75. The pinion 76 has a groove 78 for a shifter arm 79 fixed to a rock shaft 80 journaled in brackets 81, 82, Figures 5, 17, of the housing 74. An arm 83, in itself rotatably loose on said rock shaft 80, is normally held by a spring 84 against a pin 85 of an arm 86 rigidly fixed to said rock shaft 80, the latter and said arm 83 being thus yieldably connected. The pinion 76 meshes with a rack 87 on the carriage.

A cam-arm 88 for actuating the arm 83 is rotatable by the shaft 72 of the motor train through a friction coupling comprising a shouldered sleeve 89 rigidly fixed to said shaft 72 and mounting said arm 88 between friction washers 90 that are backed, the one by the sleeve shoulder, and the other by a collar 91 and friction adjusting nuts 92.

Figures 10, 11:
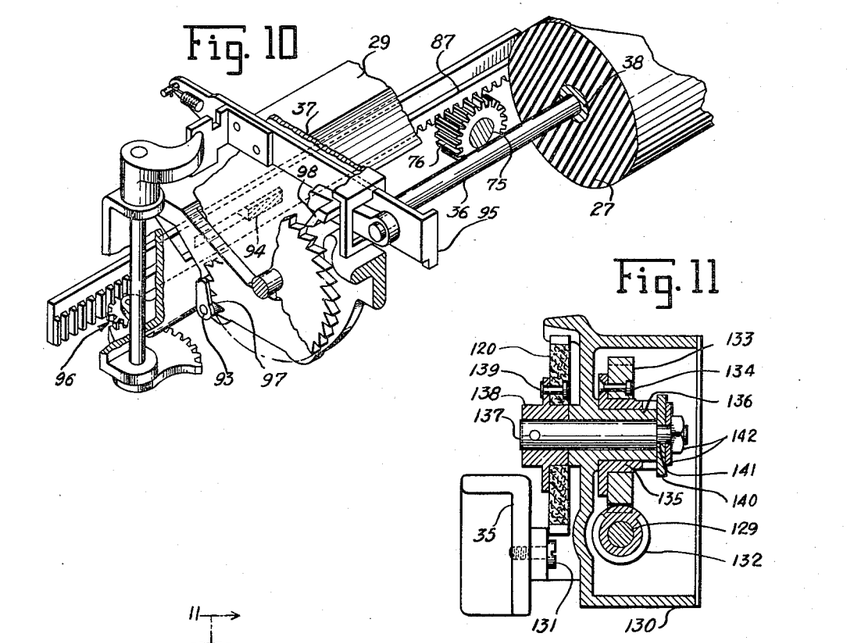
Figure 10 is a perspective of line spacing mechanism.
Figure 11 is a cross sectional view on the trace 11—11 of Figure 12.

Upon depressing the carriage return key lever 52 and thereby causing the contacts 67, 68 to close, the motor 50 is started and hence drives the shaft 72 clockwise of Figure 17 through the spring coupling 71. The cam-arm 88 initially rotates with said shaft 72 to rock the arm 83 counter-clockwise from the Figure 17 position to the Figure 18 position in which said arm 83 catches a notch 88' of the cam-arm 88 and blocks further rotation of the latter, while the shaft 72 continues rotating as is provided for by said friction coupling. The arm 83 working through the spring 84 rocks the shaft 80 to move the pinion 76 rearwardly into clutch with the clutch collar 77 of the motor driven train. In the resulting rotation of the pinion 76, the rack 87 is limitedly movable rightwardly, relatively to the carriage, upon brackets 94 of the carriage. This movement of the rack 87 relatively to the carriage line spaces the platen by means of the mechanism shown at Figure 10. Said mechanism may be as shown in the aforesaid Helmond Patent No. 1,835,776 and, briefly described, includes a line-space pawl-carrying slide 95 and an operating connection 96 therefrom to the rack 87. The platen axle 36 has a toothed line space wheel 97 engageable by a pawl 98 on said slide. A spring pressed detent lever 93, normally engages said wheel 97.

Due to the inertia of the carriage, the motor driven rack 87 moves endwise relatively thereto, for line spacing, usually before said rack picks up the carriage to return it to line start position.

A carriage return limiting margin stop 99 stationed on cross rods 101, 102, supported in the frame side-members 34, 35, cooperates with a counter-stop 103 on the carriage. As said counter-stop 103 reaches said margin stop 99, a tappet 104 on the returning carriage will have engaged a dog 105 splined to the cross rod 102 and will thereby have rocked said rod 102 counter-clockwise of Figure 17. The rod 102, thus rocked, works through linkage 106 to rock the shaft 59 counter-clockwise of Figure 18 to restore the trip link 54, and to effect retraction of the bar 65 by spring 70 to open the switch contacts 67, 68. The motor 50 is thereby deenergized while the spring coupling 71 is under a twist as the carriage is arrested by means of the margin stop 99. As the spring coupling 71 resiliently untwists again upon final stoppage of the deenergized motor, it turns the motor reversely and the motor in its reverse turning will acquire sufficient momentum to rotate the input shaft 72 reversely. This reverse rotation of the input shaft 72 is sufficient to turn the cam-arm 88 reversely, from the Figure 18 to the Figure 17 position, to release the arm 83 to cause the pinion 76 to be shifted forwardly, and thus unclutched from the clutch collar 77, by means of a spring 108, Figure 17.

The carriage return mechanism thus far described operates substantially as set forth in the aforesaid Helmond Patent No. 1,835,776.

It may be explained at this point that, for a purpose of the invention to be explained later, clutching of the pinion 76 to the clutch collar 77 by means of the cam-arm 88 depends in part upon withdrawing an arm 109 that normally opposes a lateral tab 110 of an arm 111 that is fastened to the pinion shifting rock shaft 80. Said arm 109 is in itself rotatably loose on the rock shaft 59 and is caused to be withdrawn, by means of an arm 112 rigidly fastened to said rock shaft 59, as the latter is rocked when the trip link 54 is tripped. The restoration of the rock shaft 59 slightly precedes, in point of time, the unclutching of the pinion 76 and restoration of the arm 111. For this reason a spring 113 yieldably connects the arms 109, 112, so that the arm 112 may be restored while the arm 109, as in Figure 18, rests on top of the tab 110. Normally the arm 109 abuts a pin 114 of the arm 112 as in Figure 6.

The web 25 is initially positioned around the platen 27 so that the first-line-place of a bill 26 is at the printing line. The number of lines a typed on each bill varies, of course, according to the number of calls that are to be included in the bill. One bill may have only one line, another two lines, another three lines, and so on up to the call-line capacity of the bill. Thus, for each bill 26 the platen 27 will be rotated a number of line spacing steps according to the number of lines typed on the bill. After typing the last line of a bill, the carriage may be returned to line start position and the platen may once more be line spaced inasmuch as a line spacing operation accompanies a return movement of the carriage. Then the platen is to be rotated in one sweep to advance the web to such extent that the first-line-place of the succeeding form 26 is brought into typing position.

I will now describe the mechanism, and its association with previously described features, for thus advancing succeeding forms 26 of the web 25 into typing position.

The platen 27 may be of such diameter or circumference that one complete revolution thereof will advance the web 25 an extent equal to the over-all length of one form 26, or, in other words, an extent equal to the distance between the first-line places of two consecutive forms 26.

A gear 120 may be power driven by means of the motor 50 in cycles of one complete revolution each and may be mounted on and at the right side of the machine frame 35 for meshing with a platen driving gear 121 that in itself is rotatably loose on the platen axle 36.

Therefore, the transverve motor driven shaft 72, Figure 8, is extended for driving a counter-shaft 122 that extends forwardly along and near the right side of the machine frame member 35, said shafts 72, 122 being connected by helical gears 123. A rear section 124, Figure 12, of said counter-shaft 122 has one of the helical gears 123 fixed thereto and is journaled in a housing 125 supported by a plate 126 extending from the housing 74. The other helical gear 123 is fixed to the extension of shaft 72 which may also be journaled in said housing 125. A shaft covering tube 127 may bridge the housings 74, 125, Figure 8. A forward section 129 of the counter-shaft 122 is journaled in a housing 130 secured by screws 131, Figure 12, to the right machine frame member 35. A worm 132 is fixed to said forward shaft section 129, and a companion worm gear 133 is secured as by rivets 134, Figure 11, to a hub 135 that rotates on a bearing 136 of said housing 130. Extending through said bearing 136 is a stub shaft 137 to which is fastened a hub 138 mounting the gear 120 which is preferably made of gear-noise-deadening material, said hub and gear being fastened together as by rivets 139. A plate 140 is rigidly fastened to the inner end of said stub shaft 137 by means of flats 141 on said inner end, and a nut and washer fastening 142. Said plate 140 has pivoted thereto a clutch pawl 143 that under the urge of a spring 144 anchored to said plate 140 at 145 tends to move into engagement with clutch teeth 146 formed at the end of the worm wheel hub 135.

The gear 120, and hence the plate 140, are normally positioned so that an arm 147 of said pawl 143 abuts the top of a clutch tripping arm 148 rigidly fastened to a clutch tripping rock shaft 149 journaled in the housing 130. Said pawl 143 thus abutting said clutch tripping arm 148 is normally held by the latter out of engagement with the clutch teeth 146 of the worm gear 133 as in Figure 5.

Figure 12:
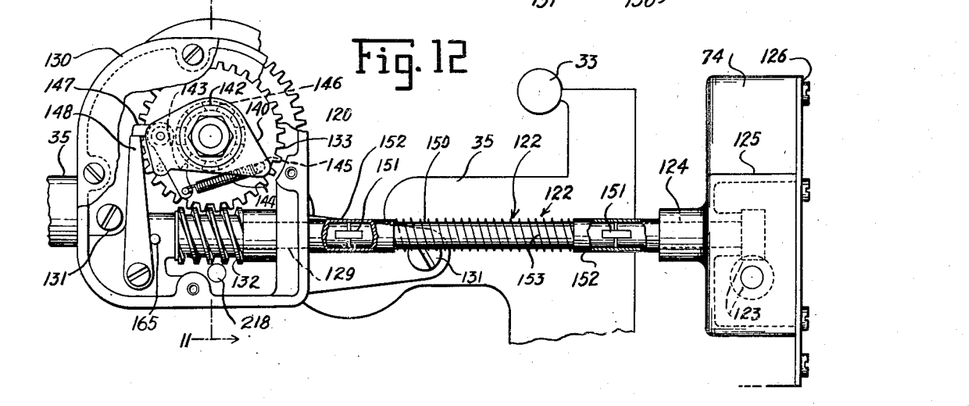
Figure 12 is a side view of the transmission mechanism as disposed in part at one side of the machine.

The counter-shaft sections 124, 129 may be connected by means of a removable shaft section 150 and shaft-section interlocking keys 151, Figure 12. Sleeves 152 for holding the intermediate shaft section 150 in place are themselves kept in place, against the housings 125, 130 by an intermediate spring 153, and it will be obvious that said sleeves 152 may be moved endwise for removing or replacing the intermediate shaft section 150.

A form-feeding cycle or single revolution of the gear 120 by means of the motor 50 is caused upon depressing a form-feeding key 156 disposed at the typewriter keyboard and further structure therefor will now be described.

Said key 156 is on a key-lever 157 fulcrumed at 158 in the framework cross member 62. An upright link 159 is pivoted to said key lever at 160 and has at its upper end a hook 161 normally over a lateral tab 162 of a lever 163 fixed to the clutch tripping rock shaft 149. A spring 164 attached to said lever 163 normally keeps the latter and the clutch tripping arm 148 in normal positions, Figure 5, in which said arm 148 abuts a stop 165 in the housing 130. Upon depressing the key lever 157, the hook 161 is drawn downwardly to rock the lever 163, and arm 148, clockwise of Figure 5 to release the clutch pawl 143 which thereupon, urged by its spring 144, moves toward the clutch teeth 146. As the lever 163 is thus rocked, another arm 166 thereof raises a link 167 to rock a lever, comprising arms 168, 169 joined by a yoke 170, counter-clockwise about a fulcrum stud 171 on the right hand bracket 60, said link 167 being connected to the arm 168.

As the arm 169 is thus rocked, a step 172 thereon is withdrawn from a lateral tab 173 of an arm 174 rigidly fastened to a transverse rock shaft 175 journaled in the brackets 60. Thereupon, a spring 176 pulling on said arm 174 tends to rock said shaft 175 clockwise until the tab 173 abuts another step 177 of the arm 169 as in Figure 6. The rock shaft 175 when fully rocked operates, through an arm 179 fixed thereon, to engage a stud 180 of the switch control bar 65 to move the latter rearwardly to cause the switch contacts 67, 68 to close to start the normally inactive motor 50.

It further results from the depression of the form feeding key lever 157 that a link 181, pivotally connected thereto and having a pin-and-slot connection 182 to an arm 183 fixed to the carriage return clutch controlling rock shaft 80, is pulled down. Said rock shaft 80 is thus prevented from being rotated accidentally to close the carriage return clutch 76, 77 while the form feed key lever 157 is depressed. The key lever 157 is kept depressed until the end of the form-feeding cycle of the gear 120. Therefore, said key lever 157 may have an arm 184 connected by a link 185 to an arm 186 that in itself is rotatably loose on the shaft 175. As said key lever 157 is fully depressed, said link 185 moves forwardly and a latch hook 187 on a rearward extension of the spring pressed arm 174 moves upwardly, as said arm 174 fully drops to the step 177, for catching a lateral tab 188 of said link 185, as in Figure 6, to latch the key lever 157 in its depressed position. The parts may be timed so that the full drop of the arm 174 to the step 177 and hence the closing of the motor switch 67, 68 do not occur until said tab 188 has been moved sufficiently forward by the key lever 157 to permit the latch hook 187 to rise fully behind said tab 188. For this purpose, the top of the latch hook 187 normally is slightly below the bottom of the tab 188, and upon depression of the key lever 157, the step 172 moves from under the tab 173 of the arm 174 and said arm 174 drops partly toward the step 177 before the tab 188 has moved forwardly sufficiently to clear said latch hook 187.

Figure 6:
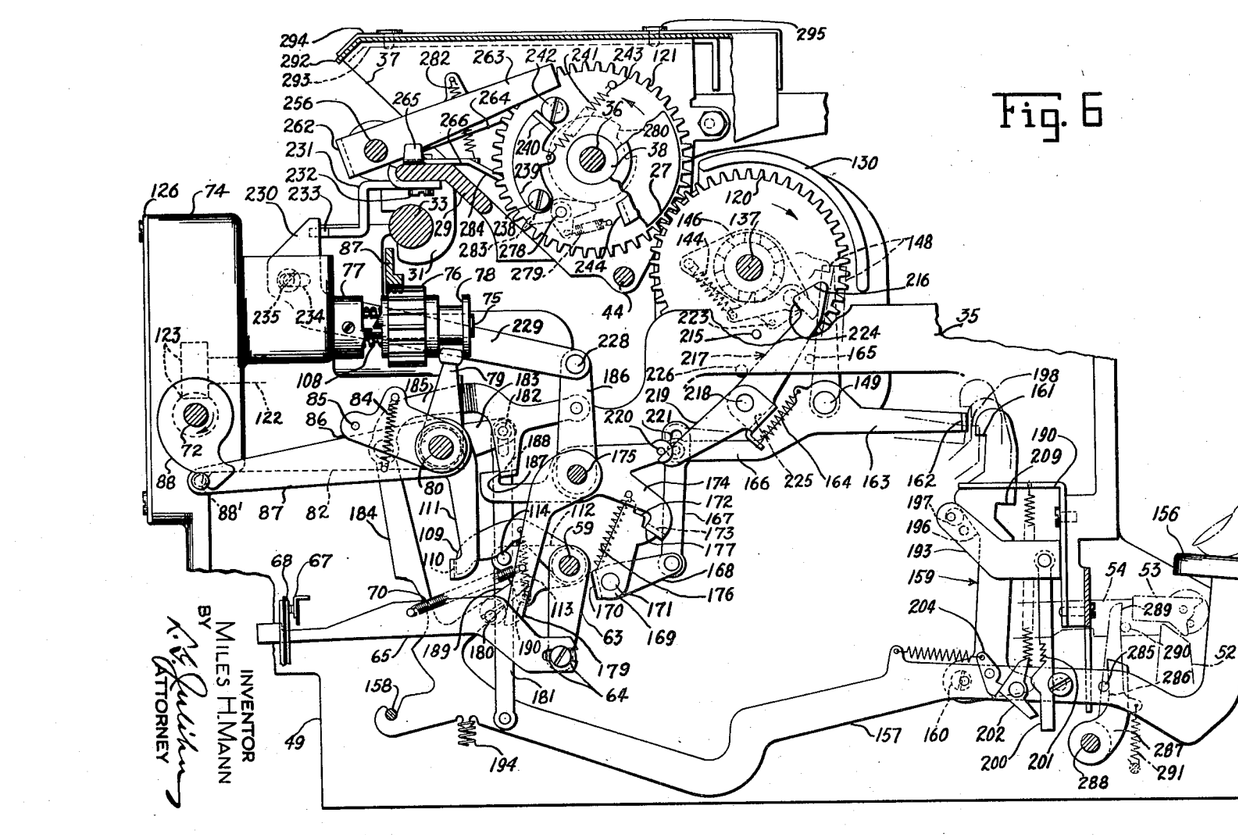
Figure 6 is a cross sectional side view showing the relative position of parts at one stage of the form-feeding cycle.

At the rotation of the motor 50 resulting from depressing the key lever 157 to the Figure 6 position, the cam-arm 88 will, of course, be rotated and the arm 83 will be rocked to the Figure 6 position. But rocking of the shaft 80 and closing of the carriage return clutch 76, 77 are blocked by the depressed key lever 157, through the link 181 and arm 183, and in that case the spring 84 that operatively connects the actuated arm 83 to said rock shaft 80 will merely yield. There is also a block, against closing the carriage return clutch 76, 77, through the arms 109, 111, as at Figure 6, because the carriage-return-key-actuatable shaft 59, and its said arm 109, are not rocked at depression of the form-feeding key lever 157. The arm 179 of the rock shaft 175 is enabled to move the switch control bar 65 rearwardly, independently of the carriage-return-key-actuatable rock shaft 59, by reason of the pin-and-slot connection 64. The key-lever 157 may have an arm 189 to oppose a lateral stud 199 in the arm 112 on said shaft 59 to keep the latter in normal position when said key lever is depressed as in Figure 6.

The clutch-trip-link 159, from the form-feed key lever 157, works in a horizontal slotted guide 190 attached to the framework. A spring 191 from said guide 190 to said link 159 urges the latter to turn counter-clockwise about its pivot 160, so that in the normal position of the parts, Figure 5, said link 159 abuts a stop 192 in an arm 193 supported by the framework. Said spring 191 cooperates with another spring 194 to keep the key lever 157 normally against the top of a key lever guide slot 195 in the cross plate 56. As said link 159 is drawn downwardly by said key lever 157, a cam 196 thereon encounters a stud 197 on the arm 193 to cause said link 159 to be rocked clockwise about its pivot 160 thereby causing the tab 162 of the concomitantly rocked clutch tripping lever 163 to escape from the link hook 161 as indicated at 198, Figure 6. By the time the link 157 is fully depressed as in Figure 6, its cam 196, meeting stud 197 will have served to move the hook 161 well away from said tab 162. This leaves the clutch-trip arm 148 free to return to its normal position, against the stop 165, for ending the cycle of revolution of the gear 120 as will become apparent.

A full stroke device may be associated with the key lever 157 and may be of the kind shown in Pitman Patent No. 1,955,606, dated April 17, 1934. Briefly described, said full stroke device includes a rod 200 pivotally pendent from the arm 193 and having teeth 201 cooperative with a pawl 202 pivoted to the key yever 157 to prevent return of said key lever 157 once the latter in its down-stroke has reached the point, say, where the clutch-trip-arm 148 is withdrawn from the pawl-clutch-arm 147. Said pawl 202 encounters a cam 203 on the rod 200 near the end of the down-stroke of the key lever 157 and the pawl is thereby thrown to the Figure 6 position, clear of the teeth 201. The cam 203 operates to throw the pawl 202 back to the tooth engaging position on the up-stroke of the key lever 157. A spring pressed detent 204 on the key lever cooperates to place the pawl 202 in either position.

Figure 5:
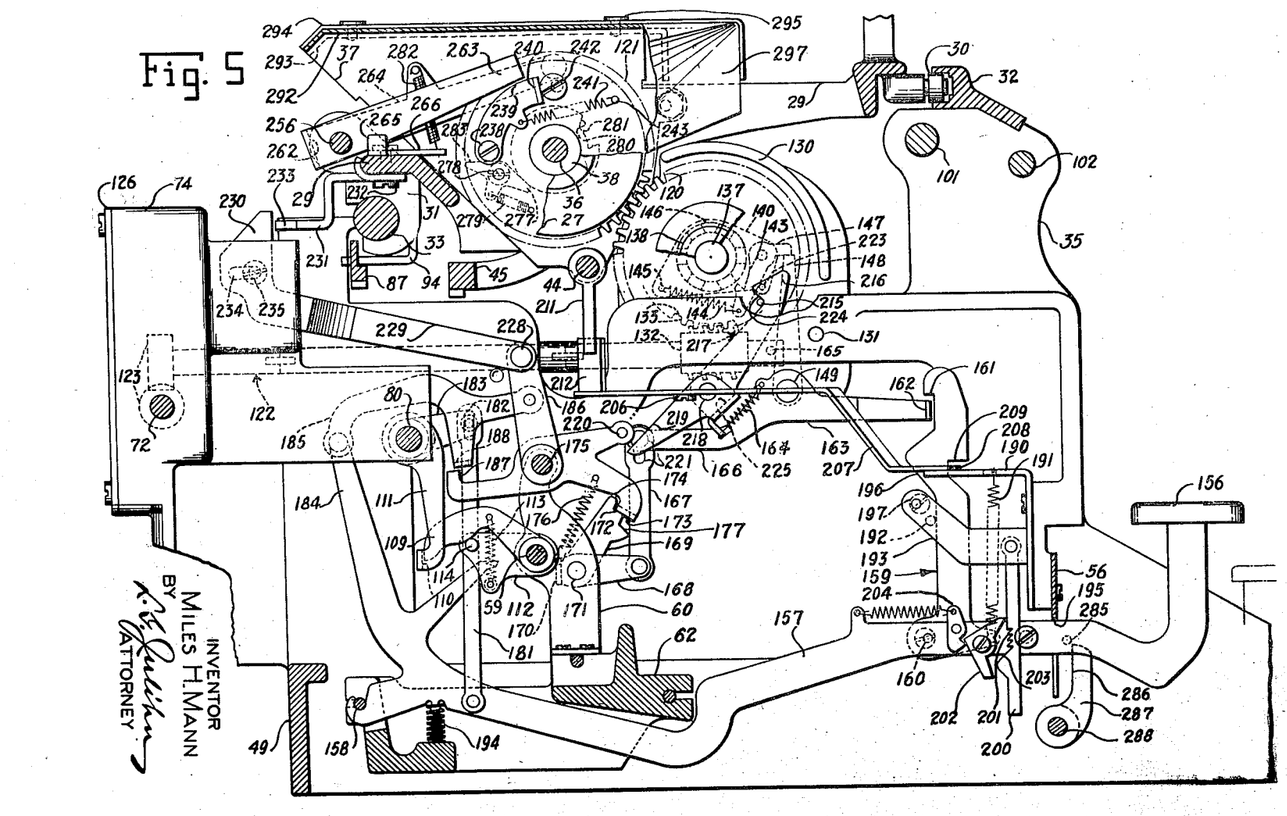
Figure 5 is a cross sectional side view of the machine from the left.

Pivoted to the framework on a vertical axis as at 206, Figures 1, 5 and 8, is a lever 207 having a forward stop end 208 for a shoulder 209 of the link 159. When the carriage is in fully returned position, a lug 211 on the carriage rod 44, engaging an upright tab 212 of said lever 207, keeps the latter in such position that the stop end 208 is withdrawn from under the shoulder as in Figure 8. At the first step of the carriage, in letter-feed direction, from its fully returned position, the carriage lug 211 recedes from said tab 212 and therefore a spring 213 turns said lever 207 counter-clockwise about its pivot 206, Figure 8, to a stop 214 to interpose the stop end 208 under the shoulder 209, and in this position, said stop end 208, resting on the horizontal guide 190, serves to stop downward movement of the link 159 and thereby prevent depression of the form-feed key lever 157 if the carriage has been advanced a letter-feed step or has been moved from its fully returned position.

With the carriage in its fully returned position, the form-feed key lever 157 may be depressed and it will be apparent now that a start of the cycle of revolution of the gear 120 will result inasmuch as the depression of the key lever has operated to cause the clutch pawl 143 to close on the worm wheel clutch teeth 146 by withdrawing the clutch trip arm 148, and to close the motor switch contact 67, 68. As the gear 120 nears the end of its cycle of revolution, a pin 215 therein encounters a cam nosed arm 216 of a lever 217 fulcrumed on a stud 218 which may project from the housing 130. Said lever 217 will thereby have become rocked to the Figure 7 position just as the clutch pawl arm 147 is about to encounter the top of the clutch trip arm 148. An arm 219 of said thus rocked lever 217 engages a pin 220 on an extension of the arm 174 which is fastened to the rock shaft 175 and the latter will thereby be rocked counter-clockwise to the Figure 7 position and cause the rock shaft arm 179 to draw the switch control bar 65 forwardly by means of the spring 70, thereby opening the switch contact 67, 68 for stopping the motor.

The counter-clockwise rocking of the shaft 175 by means of the lever 217 also lifts the arm 174 from the step 177 of the arm 169 so that the latter urged clockwise by the spring 176 is restored with its step 172 under the tab 173 of said arm 174. It will be obvious that said counter-clockwise rocking of the shaft 175 also withdraws the latch hook 187 from the tab 188 of the link 185 connected to the key lever 157, and the latter thus becomes free to be restored by the springs 191, 194. The restoration of the latch step 172 under tab 173 serves, independently of the key lever controlled tab 188, to hold the lever 174, 187 and its shaft 175 in restored position so that, if and while the key lever 157 should be kept depressed manually, after pin 215 has engaged and released lever 217, it will be impossible, nevertheless, to cause the shaft 175 to be rocked to motor-switch-closing position again.

Figure 7:
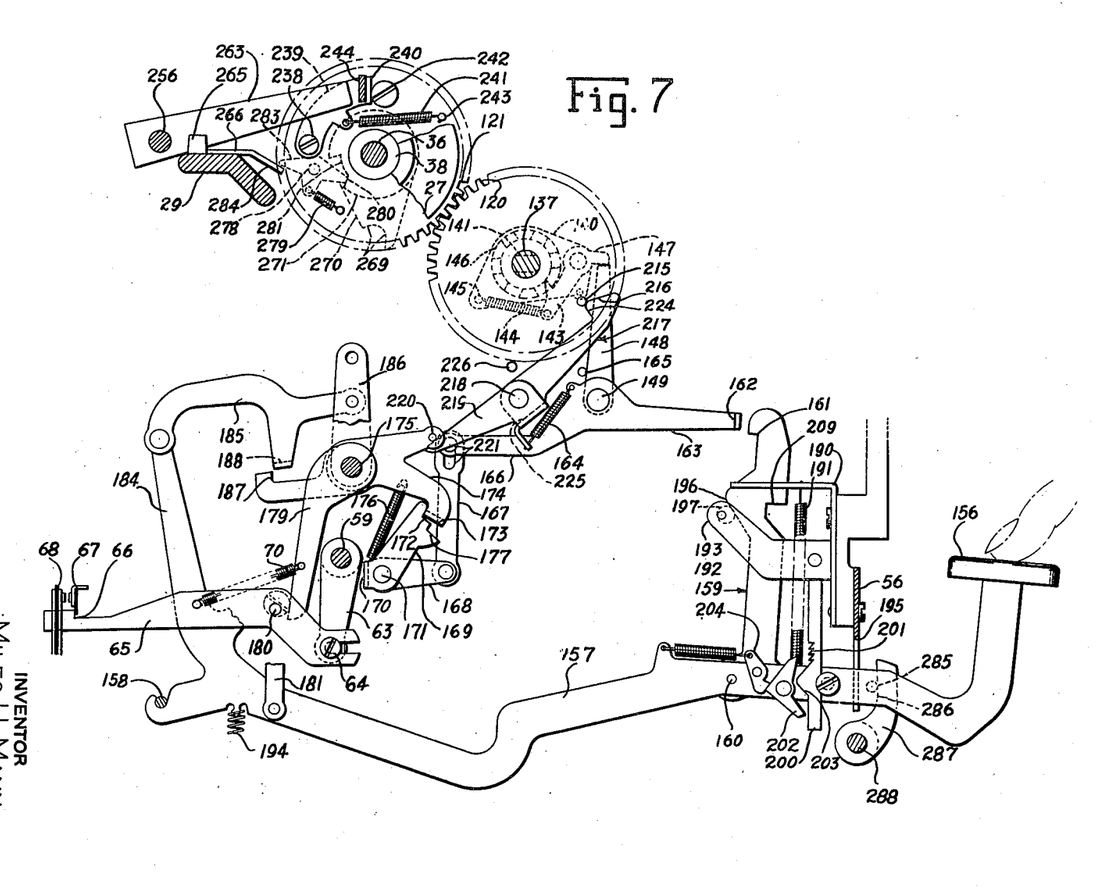
Figure 7 is a side elevation showing the relative position of parts at another stage of the form-feeding cycle.

The tab 162 of the lever 163 escapes from the hook 161 during the depression of the key lever 157, as hereinbefore explained, for the purpose of permitting said lever 163 to be rocked back to normal position, Figure 7, after the clutch pawl arm 147 has passed the clutch trip arm 148 during the first part of the revolution of the gear 120. The arm 166 of said lever 163 has a pin-and-slot connection 221 to the link 167 connected to the lever 168, 169 so that said lever may remain in the Figure 6 position while the lever 163 is thus restored.

The gear 120 completes its cycle of revolution by turning slightly further from the Figure 7 position, and therefore the clutch pawl 143, inasmuch as its arm 147 abuts the clutch trip arm 148, is caused to be withdrawn from the worm wheel clutch teeth 146. The gear 120 finally stops and will have made a complete revolution when the clutch pawl 143 encounters a stop 223 in the clutch pawl carrying plate 140. At such end of the revolution of the gear 120, its pin 215 will have passed the cam nose 216 of the lever 217 so that the latter urged by the spring 164 turns counter-clockwise to the normal Figure 5 position again and, in said position, a hook 224 of the lever 217 may engage the pin 215 to prevent rotation of the gear 120 in a direction contrary to its motor driven rotation. It will be apparent that said hook 224, clutch trip arm 148 and the clutch pawl stop 223 cooperate to lock the gear 120 against rotation in either direction when the parts are in the normal Figure 5 positions.

The arms 216, 219 of the lever 217 may be spaced apart laterally on the fulcrum stud 218 and be connected by a yoke 225. When the gear pin 215 recedes, as in Figure 6, from the cam-nosed arm 216 of the lever 217, the latter is stopped, by a pin 226 on the housing 130, to limit its return by the spring 164, which may be connected between the levers 163, 217, as in Figure 6.

The platen driving gear 121 on the carriage 29 may be of the same diameter as the motor driven gear 120 on the frame of the machine. When the carriage is in fully returned position, the two gears 120, 121 are to be in mesh so that the gear 120 during its motor driven revolution will drive the gear 121 for a form-feeding cycle or complete revolution. The gear 121 travels with the carriage in letter feed and return directions. To lock the carriage during the cycles of the gears 120, 121, the following means are provided.

Extending rearwardly from a pivotal connection 228 to the arm 186, Figure 5, is a bar 229 having an upright portion 230 opposite a bar 231 secured to the carriage frame 29 by screws 232. When the carriage is fully returned, and the form-feed key lever 157 is depressed, the latter operates through the link 185 and said arm 186 to draw said bar 229 forwardly from the Figure 5 to the Figure 6 position to place said upright portion 230 before a lateral edge 233 on the carriage bar 231. Said portion 230 thus confronting said bar 231 when the key lever 157 is latched in depressed position by means of the latch hook 187 prevents leftward movement of the carriage from its fully returned position during a form-feeding cycle. The rear end of said bar 229 may have a slot 234 for slidable support on a stud 235 in the housing 74.

Mechanism, on the carriage, associated with the platen driving gear 121, and operative as the latter is driven by cycling the power gear 120, will now be described.

Figures 13, 14, 15, 16:
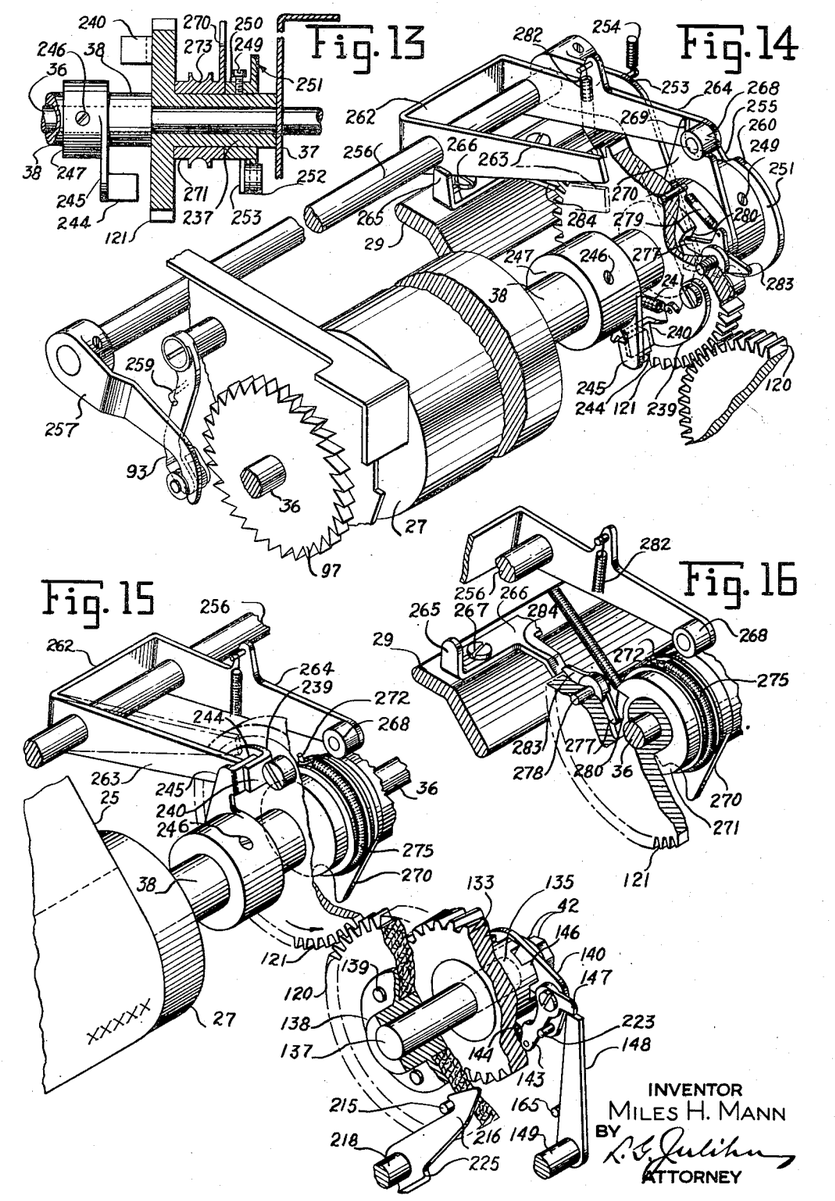
Figure 13 is a view partly in section of parts of the overthrow preventing means.
Figure 14 is a perspective of features of the platen carriage and such part of the form-feeding means as is mounted thereon, some of the parts being shown broken away and sectioned for clearness.
Figure 15 is a perspective of the paper-overthrow-preventing means at one stage of operation.
Figure 16 is a perspective showing another stage in the operation of the overthrow preventing means.

The gear 121 has a hub 237 and with the latter is rotatably loose on the platen axle 36. Said gear 121 and its hub 237 are retained laterally between the right end of the platen axle sleeve 38 and the right hand carriage end plate 37, Figure 13. Pivoted at 238 to the left side of the gear 121 is a dog 239 presenting a laterally extending lug 240. A spring 241 holds said dog 239 against a dog-backing stop 242 on said gear 121, said spring being anchored to said gear at 243.

By means of said lug 240, the gear 121 may engage a lateral lug 244 of an arm 245 fixed to the platen axle sleeve 38 by a set screw 246 in a hub 247 of said arm. With the parts in normal positions preparatory to typing the first line of a bill form 26, the front of the platen lug 244 abuts the back of the lug 240 on the gear 121, as in Figure 8.

Line spacing rotations of the platen 27 during the typing of the bill form 26 cause the platen lug 244 to rotate away from the back of the gear lug 240 as is exemplified by the relative positions of said lugs in Figures 1 and 3. The extent that the platen lug 244 is thus rotated away from the gear lug 240 varies according to the number of lines $a$ typed on the bill. It will be obvious, now, that when the platen gear 121 is driven one revolution by the power gear 120, it may turn idly on the platen axle 36 until its lug 240 picks up the platen lug 244, and it will then, for the remainder of its revolution, rotate the platen to bring the first-line-place of the succeeding bill form 26 to typing position.

A set screw 249 in a hub 250 of a cam disk 251 secures the latter rigidly to the hub 237 of the platen gear 121. In the normal position of said gear 121 and its lug 240, a detent roll 252 of an arm 253 rests, under pressure of an arm spring 254, in a detent notch 255 of said cam disk. Said arm 253 is fixed to a transverse rock shaft 256 journaled in the carriage frame 29. The platen gear 121 and its lug 240 are thus detented against rotative displacement from their normal position while said gear 121 is unmeshed from the power gear 120 during the travel of the carriage. At the start of rotation, counter-clockwise of Figure 17, of the platen gear 121 and its cam disk 251, for a form-feeding operation, the detent roll 252 is forced out of the detent notch 255 thereby rocking the shaft 256 clockwise of Figure 17. A cam arm 257 fixed to the left end of said shaft 256 acts, when the latter is thus rocked, to withdraw the line space detent arm 93 from the line spacing wheel 97 for free rotation of the platen in form feeding. At the completion of the form feeding rotation of the platen gear 121 and its disk 251, the gear detenting arm 253 reenters the detent notch 255 and its roll 252 then confronts a shoulder forming side 258 of the notch to prevent rotation of the platen gear 121 in clockwise direction of Figure 17. As the detent arm roll 252 thus reenters the detent notch 255, the cam arm 257 is, of course, withdrawn from the line space detent arm 93 so that the latter, pressed by its spring 259, reengages the line space wheel 97. While the detent roll 252 is out of the detent notch 255, it rides on the cam contour 260 of the disk 251.

Overthrow of the platen at the conclusion of its form-feeding rotation by the gear 121 is prevented by the following means.

A yoke 262 laterally spaces an overthrow-stop-arm 263 from a control arm 264. Said arms 263, 264 are loosely fulcrumed on and extend forwardly from the rock shaft 256 and are retained laterally by upstanding ears 265 of a plate 266 adjustably secured as at 267 to the carriage frame 29. At the normal position of the gear 121 and its lug 240, a roller 268 of the control arm 264 rests in an angle 269 at the top of a normally upstanding arm 270 which, with its hub 271, is rotatably loose on the hub 237 of the gear 121. Said hub and arm are retained laterally between the right side of said gear 121 and the hub 250 of the cam disk 251, Figure 13.

With its control arm 264 thus positioned, the forward stop end of the overthrow stop arm 263 stands above and thus clear of the platen lug 244 and therefore normally permits the platen to be rotated freely in line spacing direction.

Attached to a stud 272 in the arm hub 271 and passing around the latter in a groove 273, Figure 4, to extend to an anchor 274, Figure 17, on the carriage frame 29 is a helical spring 275 tending to turn said arm 270 clockwise of Figures 1 and 17.

At a suitable point in the form-feeding revolution of the gear 121, a pawl 277, pivoted at 278 to the side of said gear 121 and pressed by a spring 279, engages a side 280 of a notch 281, Figure 4, formed in the end of the hub 271 of the arm 270 so that further revolution of said gear 121 rotates said arm 270 counter-clockwise to permit the control arm 264, pressed by a spring 282 anchored to the plate 266, to drop and thereby drop the overthrow stop arm 263 into position, Figure 7, for intercepting the platen lug 244. The drop of the control arm 264 may be limited by abutment of its roller 268 with the hub rim of the rotated arm 270 as in Figures 15 and 16.

As the arm 270 is thus rotated, it winds the spring 275 around its hub 271 and thereby increasingly tensions said spring. Near the end of the revolution of the platen driving gear 121, when its lug 240 has driven the platen lug 244 almost to the effectively positioned overthrow stop arm 263, a tail 283 of the pawl 277 encounters a stop 284 on the plate 266 as in Figure 7. Thus, when the gear completes its form-feeding revolution from the Figure 7 position, the pawl 277 is caused to turn clockwise about its pivot 278 to withdraw from its engagement at 280 with the hub 271 of the arm 270 as in Figure 7. It results that said arm 270 is freed, and is rotated clockwise, by the tensioned spring 275, back to its normal upright position, Figure 17, thereby camming and lifting the control arm 264 to raise the overthrow stop arm 263 clear again of the platen lug 244.

But, before it is thus raised, said overthrow stop arm 263 will have served to engage the platen lug 244 to prevent overthrow of the platen, because, as will be obvious, the pawl 277 may become turned just sufficiently to release the arm 270 at substantially the instant, or slightly before, the platen lug 244 encounters said stop arm 263. At this time, also, the spring-pressed-detent roll snaps back into the detent notch 255 associated with the gear 121, and concomitantly the spring-pressed line-space detent arm 93 snaps into reengagement with the line space wheel 97 to finally position the gear 121 and platen 27 so that their respective lugs 240, 244 back slightly away, say, above five thousandths of an inch from the overthrow stop arm 263, and thus let up on said stop arm so that restoration of the latter by means of the cam or arm 270 and its spring 275 is facilitated. The clockwise rotation or restoration of said arm 270 by the spring 275 is stopped when its angle 269 reengages the control arm roll 268 as at Figure 17.

With the overthrow stop arm 263 thus restored to normal position at the end of a form-feeding cycle of the platen gear 121, the platen 27, with its lug 244, again becomes free to be rotated in line spacing direction.

It is also desired that the platen 27 and its lug 244 be unlimitedly rotatable in line spacing direction independently of the lug 240 of the gear 121, and it is for this reason that said lug 240 is embodied in the spring-pressed pivoted dog 239 to permit said platen lug 244, when turning in line spacing direction, to pass the gear lug 240. Said platen may have the usual finger knobs 276.

For preventing simultaneous operation of the form-feed key lever 157 and release or rearward movement of the carriage return mechanism trip link 54, the following mechanism is provided.

When said key lever 157 is depressed, a stud 285 thereon opposes, as in Figure 6, an edge 286 of an arm 287 fixed to a transverse rock shaft 288 journaled in the machine frame. Counterclockwise rotation of said shaft 288 is thus blocked and in turn said rock shaft, by means of an arm 289 fixed thereon and opposing a pin 290 in said trip link 54, blocks rearward movement of said trip link. Conversely, when said trip link 54 alone has been moved rearwardly for effecting a carriage return operation, its pin 290, engaging said arm 289, has rocked said shaft 288 counter-clockwise so that the top of the arm 287 is under the stud 285 of the key lever 157, as in Figure 18, to block depression of said key lever. A spring 291 acting on the arm 289 may restore said rock shaft 288 to and keep it in normal position in which said arm may abut the pin 290 of the restored trip link.

The platen gear 121 and the mechanism associated therewith on the carriage may be guarded by a top cover plate 292 resting on a flange 293, Figure 5, of the right carriage end plate 37, to which said plate is secured by a cap 294, Figure 3, and screws 295. A slotted stud 296 in the side of the web chute 43 cooperates to support said plate 292, as at 298, Figure 2. Said guard plate 292 may be provided with a depending front apron 297. A similar guard, 292, 297 may be provided at the left side of the carriage, Figure 3.

The spring coupling 71, Figures 8 and 9, between the motor shaft 51 and the input shaft 72 of the mechanism drive may be constructed as follows.

A helical torsion spring 300 is secured at each end to a plug 301 which may have a flange 302 to abut the spring end. Only two or three turns of each spring end are secured to the companion plug as by solder 303, the plug extending into the spring beyond a shaft receiving bore or socket 304 to present a flat 305 and a key slot 306. The flat 305 may be formed by the bottom of a cross slot S that cuts into the inner end of the bore 304 so that said flat may engage the corresponding flattened end 307 of the shaft 51 or 72 for interlock with the plug 301. The soldering or securing of the spring ends to the plugs 301 is done so that, when finished, an oblong key 308 is in place, as at Figure 9, with the ends of the key inserted in the key slots 306 of the plugs 301. The key engaging sides or faces of the key slot 306 may flare outwardly from the axis of the key, as at 309, Figure 9, so that there is rotative play between the key and key slots, whereby one plug 301 may rotate limitedly relatively to the other plug. The possible twist, indicated by the arrows, Figure 9, which the spring undergoes as the mechanism is operated and which reacts as hereinbefore described to open the carriage return clutch and to cushion the mechanism is thus limited and durability of the spring is favored. It will also be seen that if the spring should twist under the comparatively heavy form-feeding load, such twist would be limited by means of said key 306. This construction also provides for adjusting the initial tension of the spring 300. This is done, preferably before the spring coupling 71 is put between the shafts 51, 72, by pulling the spring ends apart so that the key 308 is free of at least one of the plugs 301. One spring end is then turned one or more half turns relatively to the other spring end to adjust said initial tension and then the pulled apart spring ends are allowed to come together again so that the key 308, engaging both slots 306 of the plugs again, holds the initial tension by limiting relative rotation of the plugs in the direction opposite to the arrows, Figure 9. The plug part, within the spring, that is not soldered to the latter may be sufficiently smaller in diameter than the inner diameter or bore of the spring so that when the latter is twisted it does not bind said plug part. It will be obvious in Figure 9 that the spring 300 surrounds the key 308 and thus retains the latter diametrically.

Figure 19 shows a modified spring coupling 71'. One plug 301' has a simple bore 304' to receive the shaft 51 or 72 and is fixed to the shaft by set screws 310. The other plug 301" has a head 311 and cross slot 312 therein that may slidably fit a tongue or tongues 313 of a collar 314 fixed to the shaft by set screws 315. The slot-and-tongue connection 312, 313 permits the head 311 to move along the shaft to permit expansion and contraction of the twisting or untwisting spring 300' which may be soldered at its ends to the plugs as in the hereinbefore described coupling. A cylindrical sleeve 316 loosely fits over reduced portions 317 of these plugs for support. Said portions 317 may have the radially flaring key slots 306' for the key 308'. Said sleeve retains said key 308' diametrically. The periphery of the sleeve may also prevent or limit sinuous distortion of the spring 301' when the latter is twisted. The key 308' may increase in thickness from its ends by means of the taper 318 to conduce to its strength and durability, and the key slots 306' may be similarly tapered.

Variations may be resorted to within the scope of the invention and portions of the improvements may be used without others.

What is claimed is:

1. A form-feeding typewriter having, in combination, a frame, a carriage movable laterally thereon, a revoluble platen in the carriage, a gear mounted on the frame, power mechanism operable to cycle said gear, a platen rotating gear mounted on the carriage and movable laterally therewith into and out of mesh with said power operable gear, and means controlled by the carriage for preventing operation of said power mechanism when said carriage has been moved from a position wherein said gears are properly in mesh.

2. A form-feeding typewriter having, in combination, a frame, a carriage movable laterally thereon, a revoluble platen in the carriage, a gear mounted on the frame, power mechanism operable to cycle said gear, means to effect operation of said power mechanism, a platen rotating gear mounted on the carriage and movable laterally therewith into and out of mesh with said power operable gear, means controlled by the carriage for preventing operation of said power mechanism when said carriage has been moved from a position wherein said gears are properly in mesh, and means effective automatically in conjunction with effecting operation of said power mechanism to hold said carriage against lateral movement from the position at which said gears are properly in mesh.

3. A form-feeding typewriter having, in combination, a frame, a carriage movable laterally thereon, a revoluble platen in the carriage, a gear mounted on the frame, power mechanism operable to cycle said gear, a platen rotating gear mounted on the carriage and movable laterally therewith into and out of mesh with said power operable gear, said platen gear having a one-way driving connection to said platen arranged to permit said platen to be rotated in line spacing direction independently of and relatively to said platen gear, said connection leaving said platen gear rotatably free when said platen gear is out of mesh with the cycling gear, and means detenting said platen gear angularly in a normal position relatively to said cycling gear whereby to prevent the free rotation of the platen gear while said gears are out of mesh.

4. A form-feeding mechanism for a typing machine, including, in combination, a revoluble paper-roller, an engageable stop connected to said paper roller, a driver for said roller, a stop movable from an ineffective to an effective position for engaging said engageable stop for limiting form-feeding rotation of said paper-roller by said driver, and stop-moving mechanism primarily controlled by the movement of said driver in form-feeding direction, so as to move said movable stop to effective position to limit said rotation, and finally controlled, by the movement of said driver in said form-feeding direction, so as to effect restoration of said movable stop to ineffective position.

5. In a typing machine, a form-feeding paper roller, a stop connected to said roller, a driver for said roller, a stop movable from ineffective to effective position for engaging said first stop for limiting form feeding rotation of said paper roller by said driver, a movable cam normally positioned to keep said movable stop in ineffective position, a pawl connection enabling said driver to pick up and move said cam to cause said stop to move to effective position, means effective substantially concurrently with the arrest of the paper roller by the effectively positioned stop to engage and trip said pawl connection to release said cam, and a spring acting to return the released cam to normal position to cause said stop to be restored to ineffective position.

6. In a typing machine, a form-feeding paper roller, a stop connected to said roller, a driver for said roller, a stop movable from ineffective to effective position for engaging said first stop for limiting form feeding rotation of said paper roller by said driver, a movable cam normally positioned to keep said movable stop in ineffective position, a pawl connection enabling said driver to pick up and move said cam to cause said stop to move to effective position, means effective substantially concurrently with the arrest of the paper roller by the effectively positioned stop to engage and trip said pawl connection to release said cam, a spring acting to return the released cam to normal position to cause said stop to be restored to ineffective position, and spring pressed detent means operatively connected to and causing the paper roller, upon its arrest, to back up slightly to let up its pressure on said movable stop for facilitating the restoration of said movable stop by said spring actuated cam.

7. A form-feeding mechanism for a typewriter including, in combination, a revoluble paper roller, a key, cycling mechanism trippable by said key to rotate said paper roller, a latch acting to maintain said key in operated position, latch tripping means coacting with said cycling mechanism, at the conclusion of the rotation of said paper roller by said cycling mechanism, to release said key, a typewriter member operable consonantly with typing between form feeding operations and means controlled by said key when latched to prevent operation of said typewriter member during form feeding.

8. A form-feeding mechanism for a typewriter including, in combination, a paper roller, a normally inactive electric motor, a motor controller tending to move from a normal position to a position effective to start said motor, a latch normally effective for restraining said controller, a key, a cycling clutch mechanism trippable by said key to operatively connect said paper roller and motor for a form-feeding operation, a one-way connection enabling said key to release said controller from said latch to cause it to move to start said motor, and means actuated by the motor, through the tripped clutch mechanism at the conclusion of the form-feeding operation to restore said motor controller to said latch to thereby stop said motor, said one-way connection permitting said controller to be restored independently of said key.

9. A form-feeding typing machine having, in combination, a carriage, a paper roller, a normally inactive motor, means, including a normally open clutch, forming a carriage return connection between said motor and carriage, means tending, through the rotation of said motor, to close said clutch, carriage return starting means operable to start said motor, form-feed starting means, including a motor-starting member and a clutch, operable, respectively, to cause said motor to start and said paper roller to be connected to said motor for a form-feeding operation, and means correlated to at least one of said starting means so as to be effective to restrain the closing of said carriage return clutch by the rotation of said motor when said motor rotates said paper roller, and to be ineffective when said motor is actuated by said carriage return starting means.

10. In a typing machine; a carriage, a paper roller, a normally inactive motor, an element movable to an effective position to start said motor, a clutch closeable to connect said carriage and motor, a carriage return starter, means responsive to rotation of said motor to close said clutch, a form-feeding starter and means responsive thereto to connect said paper roller to said motor, said element being operatively connected to both the carriage-return starter and the form-feeding starter so as to be movable by either starter independently of the other, and means correlated to at least one of said starters to prevent said motor from closing the carriage return clutch when said motor operates in response to said form-feeding starter.

11. In a typing machine; power operable carriage return mechanism, a power operable form feeding mechanism, a normally inactive motor, a clutch closeable to connect said carriage return mechanism to said motor, a carriage return starter operable to start said motor, means tending, through the rotation of said motor, to close said clutch, means operable jointly to connect said form-feeding mechanism to said motor and to effect starting of said motor, means normally effective to restrain said clutch closing means, whereby said motor may be operable independently of said carriage return mechanism to actuate said form-feeding mechanism, and means responsive to operation of said carriage return starter to render said restraining means ineffective.

12. In a typing machine having a frame, a typing carriage thereon and a form feeding paper roller in said carriage; form feeding mechanism including a gear on said carriage for driving said paper roller, said gear having a driving connection to said roller permitting said roller to be rotated independently, a gear mounted on said frame, said carriage gear being movable, with the carriage, into and out of mesh with said frame gear, a spring pressed clutch pawl connected to and rotatable with said frame gear, a power rotatable driver mounted on said frame, a trip element normally keeping said pawl disengaged from said driver, said trip element being retractable to release said pawl whereupon said driver rotates said frame gear and pawl, said trip element being restorable to encounter and disengage said pawl from said driver at the end of one revolution of said frame gear, a stop, rotatable with said frame gear, to limit positively the disengaging movement of said pawl effected by means of said restored trip element, whereby said stop, pawl and trip element cooperate to prevent positively overthrow of said frame gear, and a rebound check for said frame gear.

13. In a typing machine; a carriage, a paper roller, a motor, a clutch normally in open position and closeable to connect said carriage to said motor for a carriage return operation, a form-feeding key movable to operated position and tending to return therefrom, cycling mechanism operable by said motor in response to operation of said key to drive said roller, means conditioned by said key in its operated position to lock said clutch in open position, a latch automatically effective to hold said key in operated position, and means actuated by said cycling mechanism near the end of the cycle to trip said latch for consequent return of said key and restoration of said locking means to free said clutch.

14. In a typing machine; a carriage, a paper roller, a motor, a carriage return mechanism, including a shiftable starter, to cause said motor to return said carriage, form feeding mechanism, including a depressible key lever, to cause said motor to drive said roller, and interlocking means to prevent simultaneous operation of said carriage return starter and key lever, said interlocking means including a rock shaft, an arm thereon, a lateral projection on the key lever to oppose said arm only when said key lever is depressed, a second arm on said rock shaft, a lateral projection on said carriage return starter opposed by said second arm only when said key lever is depressed, said lateral projection on said carriage return starter engaging said second arm to rock said shaft to move said first arm under the projection on said key lever to prevent depression of the latter when said carriage return starter is shifted.

15. In a typing machine having a frame and a laterally movable carriage thereon, the combination of a paper-feed operator on said carriage, power operable cycling mechanism on said frame engageable with said operator by placing said carriage at a predetermined position, a member tending to move from a normal position to an operated position to determine an operation of said cycling mechanism, a retractable latch normally positioned to restrain said member, a form-feed-initiating key movable to an operated position, means conditioned by said key in its operated position to prevent movement of said carriage from its said predetermined position, an operative connection whereby said key, by its movement to operated position, retracts said latch from said member for resulting movement of the latter to its operated position and finally leaves said latch free, said freed latch tending to return to its normal position, and means coordinated with said cycling mechanism to restore said member to said freed latch consonantly with completing a cycle.

16. In a typing machine having a frame and a laterally movable carriage thereon, the combination of a paper-feed operator on said carriage, power operable cycling mechanism on said frame engageable with said operator by placing said carriage at a predetermined position, a member tending to move from a normal position to an operated position to determine an operation of said cycling mechanism, a retractable latch normally positioned to restrain said member, a form-feed-initiating key movable to an operated position, means conditioned by said key in its operated position to prevent movement of said carriage from its said predetermined position, an operative connection whereby said key, by its movement to operated position, retracts said latch from said member for resulting movement of the latter to its operated position and finally leaves said latch free, said freed latch tending to return to its normal position, means coordinated with said cycling mechanism to restore said member to said freed latch consonantly with completing a cycle, said key tending to return from operated position, and means enabling said member so long as it is in its operated position to hold said key in operated position.

MILES H. MANN.